United States Patent [19]

Schimmel et al.

[11] 4,301,707
[45] Nov. 24, 1981

[54] EMBEDDED EXPLOSIVE SEVERANCE OF NON-METALLIC MATERIALS

[75] Inventors: Morry L. Schimmel, University City; Don L. Young, Jr., Florissant, both of Mo.

[73] Assignee: McDonnell Douglas Corporation, Long Beach, Calif.

[21] Appl. No.: 88,941

[22] Filed: Oct. 29, 1979

[51] Int. Cl.³ .......................... F42B 1/00; B64C 1/32
[52] U.S. Cl. .............................. 89/1 B; 244/122 AF
[58] Field of Search ............... 89/1 B, 1 R; 102/49.5; 244/122 AF, 122 AE, 121; 85/DIG. 1

[56] References Cited

U.S. PATENT DOCUMENTS

| | | | |
|---|---|---|---|
| 2,693,326 | 11/1954 | Lobelle | 244/122 AE |
| 2,937,595 | 5/1960 | Margulis et al. | 102/49.5 X |
| 3,135,163 | 6/1964 | Mechlin et al. | 89/1 B X |
| 3,139,031 | 6/1964 | Schroter et al. | 102/49.5 X |
| 3,185,090 | 5/1965 | Weber | 102/49.5 X |
| 3,196,791 | 7/1965 | Francis et al. | 89/1 B X |
| 3,209,692 | 10/1965 | Webb | 89/1 B X |
| 3,230,885 | 1/1966 | Weber et al. | 89/1 B X |
| 3,267,662 | 8/1966 | Miller | 220/261 X |
| 3,277,766 | 10/1966 | Burkdoll | 89/1 B X |
| 3,319,520 | 5/1967 | Stefano et al. | 102/49.5 X |
| 3,323,544 | 6/1967 | Francis | 102/24 HC |
| 3,357,356 | 12/1967 | Bischoff | 102/49.5 |
| 3,453,960 | 7/1969 | Qualls | 102/49.5 |
| 3,486,410 | 12/1969 | Drexelius et al. | 89/1 B |
| 3,670,998 | 6/1972 | Charleville et al. | 244/122 AF X |
| 3,688,988 | 9/1972 | Howison et al. | 102/49.5 X |
| 3,698,281 | 12/1972 | Brandt et al. | 89/1 B |
| 3,729,154 | 4/1973 | Deplante | 244/122 AF |
| 3,782,284 | 1/1974 | Gibb et al. | 244/121 X |
| 3,806,069 | 4/1974 | Galton | 244/122 AF |
| 3,971,290 | 7/1976 | Blain | 89/1 B |
| 3,990,344 | 11/1976 | Hansen | 89/1 B |
| 4,106,875 | 8/1978 | Jewett | 102/49.5 |

FOREIGN PATENT DOCUMENTS

| | | | |
|---|---|---|---|
| 2612574 | 10/1976 | Fed. Rep. of Germany | 244/122 AF |
| 927675 | 5/1963 | United Kingdom | 102/49.5 |

OTHER PUBLICATIONS

"Canopy Severance Systems"; Explosive Technology Box K.K. Fairfield, CA. (1979).

*Primary Examiner*—David H. Brown
*Attorney, Agent, or Firm*—John P. Scholl; Donald L. Royer

[57] ABSTRACT

This invention relates to apparatus for explosively severing non-metallic material such as aircraft canopy transparencies, egress panels and other structural members. To provide a more effective use of a given amount of explosive, a detonating cord is encapsulated within the material to be severed. This encapsulation protects the cord and maximizes the severance effect of the detonation. The cord may be encapsulated at positions wherein augmented shock waves are used to accomplish fracture along a line away from the detonating cord while leaving the explosion products restricted in the remaining cord cavity.

10 Claims, 12 Drawing Figures

U.S. Patent Nov. 24, 1981 Sheet 1 of 2 4,301,707
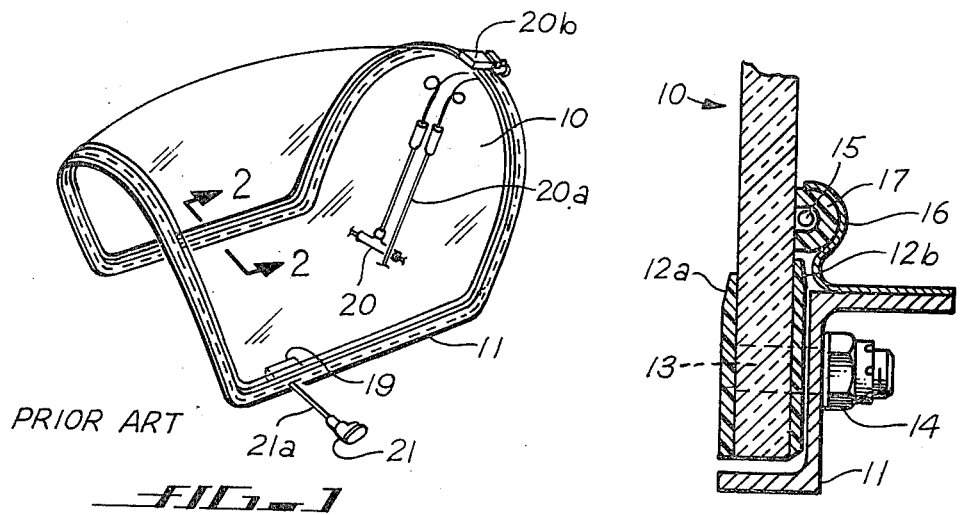
PRIOR ART
FIG-1
PRIOR ART
FIG-2
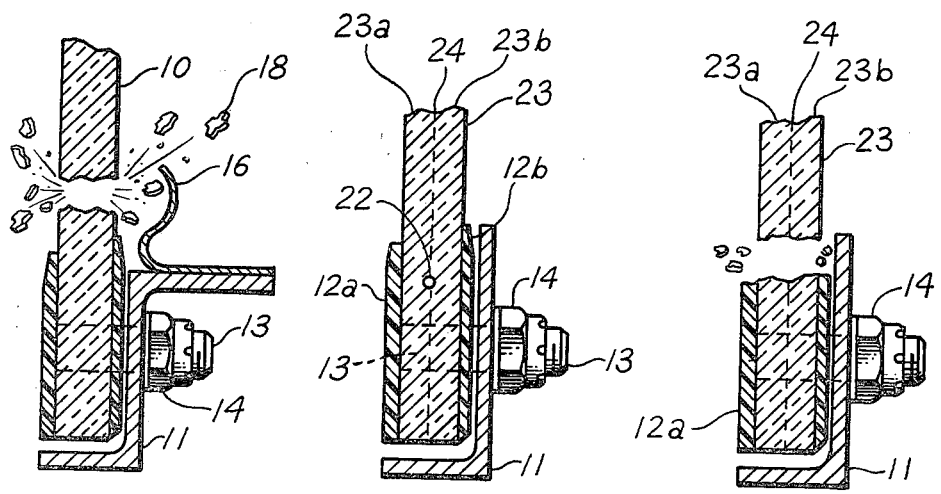
PRIOR ART
FIG-3
FIG-4
FIG-5

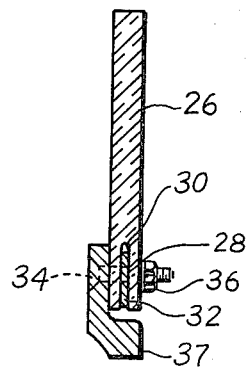
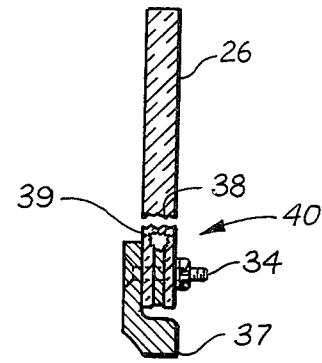
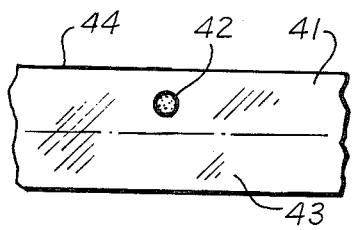
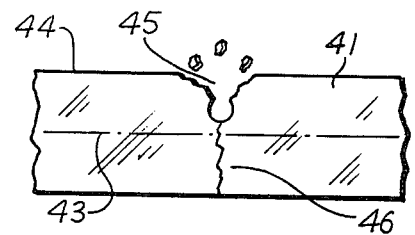
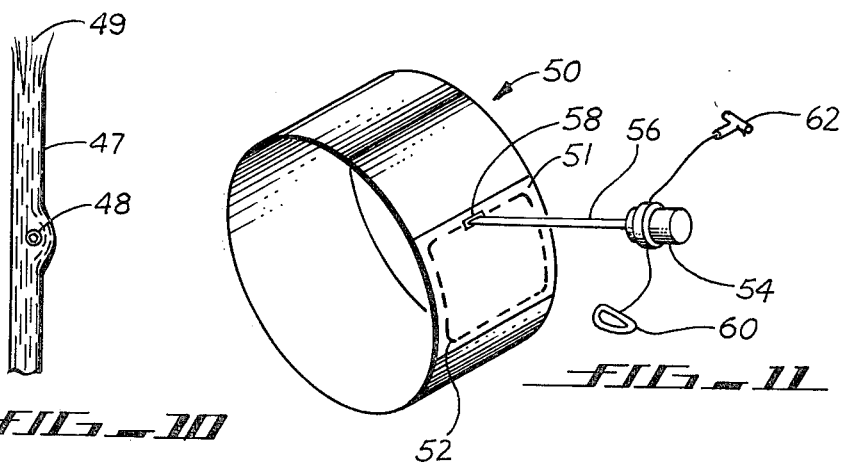
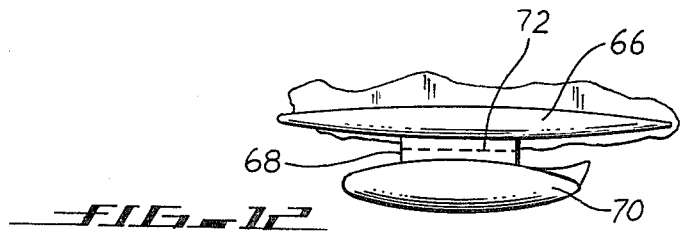

EMBEDDED EXPLOSIVE SEVERANCE OF NON-METALLIC MATERIALS

BACKGROUND OF THE PRESENT INVENTION

In the past, one method of providing an opening for the air crew through the canopy area was by jettisoning the entire canopy transparency and metal frame structure from the aircraft. A second method has been to blast and fragment the transparency with a directed charge thereby permitting removal of the transparency from the metal frame and the aircraft structure. In this second method a detonating cord is placed against the transparency in order to accomplish fragmentation. It has been found that where the detonating cord is affixed to the inside of the canopy, the cord is exposed to environmental changes as well as abrasion from crew movement within the cockpit. Accordingly, it has been necessary to shield the detonating cord to protect it and maintain its operability.

With the advent of faster aircraft and the desire to provide greater cockpit visibility, canopy structural support members have been reduced and greater loads have been placed directly upon the canopy transparency. When a full bubble canopy is utilized, it has been necessary to use thicker canopy transparency material or one which is stronger, such as a polycarbonate.

When the strength of the canopy transparency increases, it is necessary to increase the explosive charge adjacent the canopy surface to fragment the canopy transparency for removal. Even though the explosive charge is shielded from the crew, the explosion, hot gasses and fragmentation of the canopy has had undesirable effects on the crew environment. In addition to noise and blast effects, crews have been subjected to vision impairment from the explosive materials, and lead burn from high velocity metal particles from the detonating cord. It has been calculated that the explosion of a detonating cord of sufficient size mounted in accordance with the present state of the art to fragment a ¾ inch thick polycarbonate canopy could prove debilitating to the crew within the aircraft.

BRIEF DESCRIPTION OF THE INVENTIVE METHOD AND APPARATUS

The inventive apparatus is designed to provide new means of emergency severance of non-metallic materials, such as canopy transparencies, for escape of the crew or seat ejection through the canopy area. The inventive apparatus contemplates the encapsulation of the detonating cord within the material to be severed, namely the canopy transparency. This encapsulation of the cord provides environmental and abrasion protection for the detonating cord. The principal advantage, however, of embedding the detonating cord in the canopy transparency relates to the reduced amount of explosive material necessary to fragment or fracture the canopy transparency. It has been found that between ¼ and 1/6 the amount of explosive is necessary to sever the canopy from the frame structure when the detonating cord is encapsulated within the canopy material as opposed to mounting the unconfined detonating cord on the side of the canopy transparency. This reduction in explosive reduces the blast and noise as well as other harmful affects upon the crew environment.

Under controlled conditions, encapsulating the cord in the canopy material and utilizing augmented shock waves, a severance crack can be produced away from the detonating cord cavity. In this instance, the explosive blast is completely contained within the transparent canopy material and the crew is shielded from the harmful effects of the explosion. When utilizing augmented shock waves to produce a severance crack, the amount of explosive in the detonating cord can be even further reduced and the effect on the crew environment is kept to a minimum. It also is contemplated that a suitable detonating cord may be encapsulated within the canopy structure at a controlled depth to produce a fragmentation effect toward the outside of the canopy structure from the detonating cord and a severance crack toward the inside of the structure between the detonating cord and inside of the canopy transparency adjacent the crew.

Pyrotechnic cutting with embedded explosives is adaptable for jettisoning egress panels or external aircraft stores as well as canopies. It also may be used for quick severance of structural members, as for example missile stage separation.

BRIEF DESCRIPTION OF THE DRAWINGS

FIG. 1 is in an oblique view of a canopy transparency and frame with detonating cord placed adjacent the inside perimeter of the transparency.

FIG. 2 is a section view along the line 2—2 of FIG. 1 showing the location of the detonating cord as it is attached to the inside of the canopy transparency.

FIG. 3 shows the canopy structure of FIG. 2 following explosive severance of the canopy.

FIG. 4 shows a canopy transparency constructed according to the present invention with the detonating cord encapsulated in the center of the transparency material to be severed.

FIG. 5 shows the canopy structure of FIG. 4 following an explosive severance of the canopy transparency from the metal frame member.

FIG. 6 shows a section of a polycarbonate canopy structure with encapsulated detonating cord.

FIG. 7 shows the structure of FIG. 6 following detonation with a severance crack induced by augmented shock waves.

FIG. 8 shows an alternative location of the embedded detonating cord for explosive severance.

FIG. 9 shows the structure of FIG. 8 following detonation with fragmented upper surface and lower severance crack.

FIG. 10 is a cross-sectional view through a section of composite material with an embedded explosive chord.

FIG. 11 is an oblique view of a section of an aircraft fuselage section incorporating a jettisonable egress panel.

FIG. 12 is an oblique view of an aircraft wing and external store wherein the pylon attaching the store to the wing has an embedded explosive cord (in dashed line).

DETAILED DESCRIPTION OF THE PREFERRED EMBODIMENT

In prior art canopy severance systems, as shown in FIGS. 1, 2, and 3, the canopy transparency 10 is mounted to the metal framework 11 by bracing strips 12a and 12b and held in place by bolt 13 and nut 14 to the frame 11. The frame 11 is held to the aircraft by mechanical means (not shown). An explosive detonating cord 15 is placed against the inside surface of the canopy transparency 10. A retaining shield 16 is bonded to frame 11. It surrounds charge holder 17 and the detonating cord 15. The shield holds the cord in position and provides abrasion protection for the cord 15. Charge holder 17 fills the space between the cord 15 and the shield 16. The shield 16 furnishes the crew members with limited protection from the blast and debris 18 resulting from the explosion of the detonating cord 15.

In FIG. 1 two redundant initiators 19 and 20 are shown. Initiator 19 may be mechanically activated from the outside of the aircraft by pulling handle 21 which is connected to cord 21a. Cord 21a activates initiator 19. Initiator 20 may be activated by the crew from the inside of the cockpit. Initiator 20 fires detonating lines 20a which activates booster 20b which fires cord 15. Because of the location of the detonating cord 15 on the inside surface of the canopy transparency 10, the explosion affects the crew environment by overpressure, noise and contaminants, such as lead particles.

In the inventive canopy severance system (FIGS. 4 and 5) the detonating cord 22 may be encapsulated within the transparent canopy material 23 at its center line 24. The canopy transparency 23 is mechanically affixed to the canopy frame 11 by bracing strips 12a and 12b and by bolt 13 and nut 14. In FIG. 5 the detonating cord 22 has exploded and the canopy transparency 23 has been fragmented and detached from the canopy frame 11. It has been found that 3.0 grains per foot of dipicramide (DIPAM) explosive cord will separate a 0.60 inch cast acrylic canopy specimen. Tests have proven that when the detonating cord 22 is embedded in the canopy transparency 23, it will sever from four to six times a greater thickness of canopy transparency material than unconfined detonating cord 15 (FIG. 2) on the surface of the material.

The detonating cord 22 may be embedded in the canopy material 23 by being placed there when the material is cast (cast acrylic) or it can be emplaced in the glue line along the center line 24 when the canopy transparency 23 is made up from two sheets 23a and 23b of material such as stretched acrylic, cast acrylic, polycarbonate or combinations thereof. The cord 22 also may be placed in the canopy material 23 by cutting a perimeter groove in the canopy, inserting the cord and filling the groove.

Newer and stronger materials, such as polycarbonates, are now being utilized for canopy transparencies. In FIG. 6 a section of 0.312 inch thick piece of polycarbonate is used as the canopy transparency 26. A 0.063 inch perimeter groove 28 was cut in the polycarbonate 26 to receive 7.5 grains per foot of DIPAM silver sheathed detonating cord 30. The 0.080 inch outside diameter cord 30 was flattened to a thickness of 0.060 plus or minus 0.003 inch and was pressed into the 0.063 inch groove 28 in the polycarbonate canopy material 26. The groove 28 was filled with ZZ-R-756 class 1B common grade 50 silicone rubber 32. The transparency 26 is mechanically attached by a bolt 34 and nut 36 to metal canopy frame 37. Upon explosive detonation of the cord, the transparency separated cleanly along a line 38 about ¼ inch above the detonating cord cavity 39, as shown in FIG. 7.

High speed photography substantiated that the separation occurred with essentially no fragmentation. The separation occurred due to augmented shock waves in the solid section of the polycarbonate transparency material 26. The section 40 of the transparency 26 containing the detonating cord was left intact and the blast was confined in the tough polycarbonate material. As a result of the confined blast the crew environment within the cockpit of the aircraft would be left substantially unaffected.

FIG. 8 is a cross section through the top of a cast canopy transparency 41 wherein the detonating cord 42 is encapsulated within canopy transparency 41. The cord is not located directly on the center line 43 of the transparency 41 but biased toward the exterior or outside surface 44 of the canopy transparency 41. When the detonating cord 42 is exploded, as shown in FIG. 9, the exterior portion 45 of the canopy from the detonating cord outward is fragmented and blasted away while the interior portion 46 of the canopy located from the detonating cord 42 inward toward the crew is cracked. In this manner, the major portion of the blast is directed away from the crew members.

FIG. 10 is a cross section through a piece of composite structure 47. Detonating cord 48 has been encapsulated between the layers 49 of fiber laminate of the structure 47.

In FIG. 11, a schematic section of an aircraft fuselage 50 is shown with an emergency access panel 51 located therein. The panel 51 preferably would be constructed from composite material and a detonating cord 52 (in dotted line) is embedded in the center of the composite panel 51 as in FIG. 10. A detonator 54 embodying a safe/arm switch is provided to fire detonating lines 56 which activate booster 58 which fires cord 52 in egress panel 51. The detonator 54 is activated by pulling on inside handle 60 or outside handle 62.

In FIG. 12, an aircraft wing 66, external store pylon 68 and external fuel tank 70 are shown. Embedded in the pylon material around the circumference thereof is a detonating cord 72 (in dotted line). A detonator (not shown) initiates the cord 72. A handle (not shown) is connected to the detonator to fire the cord 72. In the alternative, an electrical detonator may be used to fire the cord 72. In this instance, an electrical switch may be located in the aircraft cockpit to fire the cord. When the cord 72 if fired, the pylon 68 between the fuel tank 70 and the aircraft wing 66 is severed and the tank 70 is jettisoned from the aircraft. Severance by use of an embedded detonating cord can be used to cut other non-metallic structural members as well, such as separating the stages of missiles.

The non-metallic member may be elastomers, polycarbonates, acrylics or composites. The composites may contain fibers of glass, Kelvar (Aramid fiber), graphite or boron. The binder material in the composites may be elastomers, resins or epoxies.

The explosive cord may be emplaced in the structure when the material is cast, as for example in resins, epoxies or acrylics (FIG. 8). It may also be emplaced between layers, as for example in composites (FIG. 10) or in the glue line in between two layers of material (FIG. 4). Where the placement of the cord is near the edge of the structure, a perimeter groove may be cut in the structure (FIG. 6) and the cord placed in the groove. The remainder of the groove is then filled with the same material as the structure or other potting material.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. An explosively severable non-metallic transparent structure comprising:
    a frame member;
    a transparent member attached to said frame member;
    a detonating cord encapsulated within said transparent member;
    an initiator to activate the detonating cord;
    said detonating cord being of sufficient size to explosively fragment said transparent member along the detonating cord line and separate a major portion of said transparent member from the frame member.

2. The structure of claim 1 wherein said transparent member is made up of at least two sheets of transparent material having a bond line therebetween and said detonating cord is encapsulated at said bond line between said two sheets of material.

3. The structure of claim 1 wherein said transparent member includes:
    first and second side surfaces;
    a slot cut in the perimeter of said transparent member generally parallel to said first and second side surfaces thereof, said detonating cord being inserted in said slot; and
    filler compound filling said slot to encapsulize said detonating cord.

4. The structure of claim 1 wherein said transparent member is made of cast acrylic and has inner and outer surfaces and said detonating cord is encapsulated in said transparent material during the casting process.

5. The structure of claim 4 wherein said detonating cord is substantially closer to said outer surface than said inner surface.

6. A severable non-metallic structure comprising:
    a frame member;
    a non-metallic member attached to said frame member;
    a detonating cord encapsulated within said non-metallic member;
    an initiator to explode said detonating cord; and
    said detonating cord being sized and positioned to utilize augmented shock waves to produce a severance crack in said non-metallic member adjacent said detonating cord wherein the explosion is confined to the cord cavity.

7. The severable non-metallic structure of claim 6 wherein the non-metallic member is made of transparent material.

8. The structure of claim 7 wherein said transparent material is a polycarbonate.

9. An explosive severable structure comprising:
    a frame member,
    a non-metallic member attached to said frame member,
    at least one detonating cord encapsulated within said non-metallic member,
    an initiator to explode said detonating cord; and
    said detonating cord being sized and positioned to fragment said non-metallic member thereby severing said non-metallic member permitting detachment of said non-metallic from said frame member.

10. The explosive severable structure of claim 9 wherein the non-metallic member is a fiber reinforced composite.

* * * * *